(12) United States Patent
Clucas et al.

(10) Patent No.: US 10,787,261 B2
(45) Date of Patent: Sep. 29, 2020

(54) AIRCRAFT SEAT SYSTEM

(71) Applicant: RECARO Aircraft Seating GmbH & Co. KG, Schwaebisch Hall (DE)

(72) Inventors: Daniel William Clucas, London (GB); Ali Ersan, London (GB)

(73) Assignee: RECARO Aircraft Seating GmbH & Co. KG, Schwaebisch Hall (DE)

( * ) Notice: Subject to any disclaimer, the term of this patent is extended or adjusted under 35 U.S.C. 154(b) by 252 days.

(21) Appl. No.: 15/125,995

(22) PCT Filed: Mar. 13, 2015

(86) PCT No.: PCT/EP2015/055353
§ 371 (c)(1),
(2) Date: Sep. 14, 2016

(87) PCT Pub. No.: WO2015/144464
PCT Pub. Date: Oct. 1, 2015

(65) Prior Publication Data
US 2017/0081030 A1    Mar. 23, 2017

(30) Foreign Application Priority Data
Mar. 24, 2014 (DE) .......... 10 2014 104 054

(51) Int. Cl.
*B64D 11/06* (2006.01)

(52) U.S. Cl.
CPC ...... *B64D 11/0641* (2014.12); *B64D 11/0601* (2014.12)

(58) Field of Classification Search
CPC .................. B64D 11/0641; B64D 11/0601
See application file for complete search history.

(56) References Cited

U.S. PATENT DOCUMENTS

| 6,237,872 B1 * | 5/2001 | Bar-Levav | B64D 11/00 |
| | | | 105/314 |
| 2007/0164157 A1 * | 7/2007 | Park | B60N 2/34 |
| | | | 244/118.6 |

(Continued)

FOREIGN PATENT DOCUMENTS

| GB | 2500258 A | 9/2013 |
| WO | 00/10833 A1 | 3/2000 |

(Continued)

OTHER PUBLICATIONS

German Search Report dated Dec. 11, 2014 in the corresponding DE application No. 10 2014 104 054.6. (Partial English translation attached.).

(Continued)

*Primary Examiner* — Brian M O'Hara
*Assistant Examiner* — Keith L Dixon
(74) *Attorney, Agent, or Firm* — Posz Law Group, PLC (57) ABSTRACT

An aircraft seat system has at least one first aircraft seat region, which includes a first aircraft seat, and at least one second aircraft seat region, which is arranged behind the first aircraft seat region and includes a second aircraft seat, wherein, in a mounted state, the aircraft seat of the second aircraft seat region is arranged, at least in a lying position, at least partially overlapping beneath the first aircraft seat region.

18 Claims, 3 Drawing Sheets

(56) References Cited

U.S. PATENT DOCUMENTS

| | | | |
|---|---|---|---|
| 2007/0241232 A1* | 10/2007 | Thompson | B64D 11/02 244/118.6 |
| 2009/0066121 A1 | 3/2009 | Jacob | |
| 2009/0243358 A1* | 10/2009 | Henshaw | B60N 2/242 297/340 |
| 2012/0223186 A1* | 9/2012 | Henshaw | B64D 11/06 244/118.6 |
| 2012/0292957 A1 | 11/2012 | Vergnaud et al. | |
| 2012/0298798 A1* | 11/2012 | Henshaw | B64D 11/06 244/118.6 |
| 2012/0305705 A1 | 12/2012 | Vergnaud et al. | |
| 2013/0032668 A1* | 2/2013 | Foucher | B64D 11/06 244/118.6 |
| 2013/0106156 A1* | 5/2013 | Orson | B64D 11/0638 297/217.3 |
| 2014/0283296 A1* | 9/2014 | Jerome | B60N 2/34 5/12.1 |
| 2015/0166182 A1* | 6/2015 | Ducreux | B64D 11/06 244/118.6 |
| 2015/0166183 A1* | 6/2015 | Henshaw | B64D 11/0601 244/118.6 |
| 2015/0336674 A1* | 11/2015 | Foucher | B64D 11/06 244/118.6 |
| 2016/0016667 A1* | 1/2016 | Schmidt-Schaffer | B64D 11/0627 244/118.6 |
| 2016/0083094 A1* | 3/2016 | Clucas | B64D 11/0636 244/118.6 |
| 2016/0297529 A1* | 10/2016 | Cailleteau | B64D 11/0601 |
| 2017/0327232 A1* | 11/2017 | Morgan | B64D 11/06 |

FOREIGN PATENT DOCUMENTS

| | | |
|---|---|---|
| WO | 2005/014395 A1 | 2/2005 |
| WO | 2010/100500 A1 | 9/2010 |

OTHER PUBLICATIONS

International Search Report of International Searching Authority dated Jun. 16, 2015 in the corresponding international application No. PCT/EP2015/055353.

International Preliminary Report on Patentability of International Searching Authority dated Sep. 27, 2016 in the corresponding international application No. PCT/EP2015/055353.

Office Action dated Aug. 1, 2019 issued in corresponding EP patent application No. 15 711 466.1 (and English translation).

* cited by examiner

AIRCRAFT SEAT SYSTEM

CROSS REFERENCE TO RELATED APPLICATIONS

This application is a U.S. national stage application of PCT/EP2015/055353 filed on Mar. 13, 2015, which is based on German Patent Application No. 10 2014 104 054.6 filed on Mar. 24, 2014, the contents of which are incorporated herein by reference.

PRIOR ART

The invention relates to an aircraft seat system according to the preamble of patent claim 1.

An aircraft seat system having at least one first aircraft seat region, which comprises a first aircraft seat, and having at least one second aircraft seat region, which is arranged behind the first aircraft seat region and comprises a second aircraft seat, has already been proposed.

The object of the invention consists in particular in providing an apparatus of the generic type having improved characteristics with respect to a particularly advantageous compact arrangement of aircraft seats installed in an aircraft. The object is achieved according to the invention by virtue of the features of patent claim 1, while advantageous designs and refinements of the invention can be gleaned from the subclaims.

Advantages of the Invention

According to the invention, an aircraft seat system having at least one first aircraft seat region, which comprises a first aircraft seat, and having at least one second aircraft seat region, which is arranged behind the first aircraft seat region and comprises a second aircraft seat, is proposed, wherein, in a mounted state, the aircraft seat of the second aircraft seat region is arranged, at least in a lying position, at least partially overlapping beneath the first aircraft seat region. By an "aircraft seat" should here be understood, in particular, a seat which is mounted in a cabin of an aircraft and which is provided to provide a seat for a person in the aircraft. By an aircraft seat should in this context be understood, in particular, a Business Class aircraft seat or a First Class aircraft seat. In principle, it is also conceivable, however, that the aircraft seat is configured as an Economy Class aircraft seat. By an "aircraft seat region" should here be understood, in particular, a region which is at the disposal of a person in an aircraft cabin. An aircraft seat region here preferably has a plurality of attachment elements for use by a passenger, such as, for instance, a table top, a monitor or storage facilities. By "provided" should be understood, in particular, specially set out and/or equipped. By an object being provided for a specific function should be understood, in particular, that the object fulfils and/or performs this specific function in at least one application state and/or operating state. By an "installed state" should here be understood, in particular, a state in which the aircraft seats are fixedly installed in an aircraft. By a "TTL position" should here be understood, in particular, an upright position of the aircraft seat, which for safety reasons must be adopted in particular in a take-off phase, in a landing phase and during turbulences. In the TTL position, a backrest of the aircraft seat and the seat bottom here stand substantially perpendicular to each other, preferably at an angle of between 90 degrees and 105 degrees. The TTL position here forms a first end position, into which the aircraft seat is maximally adjustable. By a "lying position" should here be understood, in particular, a substantially horizontal position of the aircraft seat, in which both the seat bottom and the backrest of the aircraft seat are oriented substantially parallel to the support plane on which the aircraft seat is mounted. In the lying position, the seat bottom and the backrest of the aircraft seat respectively have an orientation, wherein the orientations are oriented substantially parallel to each other. By the phrase "at least partially overlapping" should here be understood, in particular, that at least one region of the second aircraft seat in the lying position, in a view perpendicular to the support plane, is arranged in overlap with the first aircraft seat region. As a result, the two aircraft seats arranged one behind the other can be positioned at a particularly advantageously small distance apart, wherein both aircraft seats form in the lying position an advantageously large lying surface. In particular an advantageously compact arrangement of aircraft seats having an advantageously large aircraft seat region can hence be provided in an aircraft.

It is further proposed that the aircraft seats of the two aircraft seat regions are oriented in mutual alignment. By the "aircraft seats being oriented in mutual alignment" should here be understood, in particular, that center axes of the two aircraft seats, which are oriented in the seat direction, lie coaxially to each other. One aircraft seat is here arranged precisely behind the other aircraft seat. By a "seat direction" should here be understood, in particular, a direction which, when a passenger is sitting normally, substantially corresponds to the direction in which the thighs of the passenger extend from the buttocks to the knee region. In an upright setting of an aircraft seat, in which a backrest is oriented perpendicular to the support plane, the seat direction is oriented parallel to a cabin floor and perpendicular to the backrest surface formed by the backrest. Two aircraft seats arranged one behind the other can hence be oriented relative to each other in a particularly advantageous and space saving manner.

Furthermore, it is proposed that the second aircraft seat is arranged behind the first aircraft seat. A particularly advantageous arrangement of the aircraft seats can hence be achieved.

It is further proposed that the first aircraft seat and the second aircraft seat have an installation spacing maximally amounting to 65 inches. By an "installation spacing" should here be understood, in particular, a distance by which two elements, in particular the two aircraft seats, are installed spaced apart in the aircraft. The installation spacing between the two aircraft seats is here measured between two same points on the two aircraft seats, for instance between a front edge of a support unit of the aircraft seats or a rear edge of backrests of the two aircraft seats, wherein the two aircraft seats have a same position, such as, in particular, the TTL position. The aircraft seats of the aircraft seat regions arranged one behind the other hence form a particularly advantageously compact unit.

Moreover, it is proposed that, in a lying position, the aircraft seat of the second aircraft seat region overlaps by at least 10 inches with the aircraft seat of the first aircraft seat region. By "overlap by at least 10 inches" should here be understood, in particular, that the aircraft seat overlaps by at least 10 inches, preferably at least 12 inches, and in a particularly advantageous design at least 15 inches, with the second aircraft seat region. A particularly advantageously compact arrangement of the two aircraft seats can hence be achieved.

It is also proposed that the aircraft seat of the first aircraft seat region has a seat bottom which, in an adjustment from a TTL position into a lying position, is provided to be raised. By a "seat bottom" should here be understood, in particular, a bottom of a seat, in particular an aircraft seat, which is provided to provide a seat surface for a passenger. By the "seat bottom being raised" should here be understood, in particular, that the seat bottom, in an adjustment from the TTL position into the lying position, is moved away from the cabin floor. In a lying position, the aircraft seat can hence be positioned particularly advantageously for an overlap with the second aircraft seat.

It is further proposed that the aircraft seat of the second aircraft seat region has a seat bottom which, in an adjustment from a TTL position into a lying position, is provided to be lowered. In a lying position, the aircraft seat can hence be positioned particularly advantageously for an overlap with the first aircraft seat.

It is further proposed that the seat bottom of the first aircraft seat has in its III position a same height as the seat bottom of the second aircraft seat in its TTL position. In a TTL position, the two aircraft seats hence advantageously have a same seat height.

Moreover, it is proposed that the first aircraft seat region has a rigid leg rest, the height of which is greater than a height of a rigid leg rest of the second aircraft seat region. By a "rigid leg rest" should here be understood, in particular, a leg rest which is fixedly connected to a bracket, in particular to an ottoman, and which, together with the elements of an aircraft seat, such as backrest, seat bottom and leg rest, forms a planar lying surface. In a sitting position of the aircraft seat, such as, for instance, in the ITT, position, the rigid leg rest is arranged distanced from the aircraft seat and extends the aircraft seat only in the lying position. The leg rests can hence be arranged particularly advantageously for the formation of the lying surfaces of the two aircraft seats.

It is also proposed that the aircraft seats, in the lying position, form a planar lying surface. By the aircraft seats "in the lying position forming a planar lying surface" should here be understood, in particular, that elements of the aircraft seats, such as, in particular, a backrest, a seat bottom and a leg support, respectively form a plane surface. The planar lying surface here has an angle of 3 degrees to a cabin floor. In the lying position, the aircraft seat can hence provide, a particularly ergonomic and advantageous lying surface.

Furthermore, it is proposed that the first aircraft seat region has a monitor, the height, of which is greater than a height of a monitor of the second aircraft seat region. The monitors can hence be advantageously arranged for the different lying heights of the two aircraft seats.

It is further proposed that the aircraft seats are oriented inclined with respect to a flight direction. By a "flight direction" should here be understood, in particular, a direction of principal extent of the aircraft, wherein the flight direction extends from a tall of the aircraft to a nose of the aircraft and preferably runs coaxially to a center axis of the aircraft. By "aircraft seats being oriented inclined with respect to the flight direction" should here be understood, in particular, that a seat direction of the seats in a state installed in the aircraft has an angle between 5 degrees and 20 degrees to the flight direction. A particularly advantageous arrangement of the aircraft seats can hence be achieved.

It is also proposed that the aircraft seat regions respectively have a direct aisle access. By an "aisle access" should here be understood, in particular, a direct access from an aircraft aisle co the aircraft seat region. An access to an aircraft seat region here runs, in particular, not through another, adjacent aircraft seat region. A passenger can pass directly from the aircraft aisle into his aircraft seat region. The aircraft seats can hence be reached particularly advantageously.

Moreover, it is proposed that the aircraft seat system has at least two further first and second aircraft seat regions. By "further first and second aircraft seat regions" should here be understood, in particular, aircraft seat regions which are configured and oriented relative to each other in the same way as the first aircraft seat region and the second aircraft seat region, which respectively comprise an aircraft seat. The first and the second aircraft seat region, as well as the further aircraft seat regions, are here arranged in a herringbone arrangement in an aircraft cabin. An aircraft cabin can hence be equipped particularly advantageously with aircraft seats.

It is further proposed that the aircraft seat system has at least two further first and second aircraft seat regions, which are arranged in mirror image to the aircraft seat regions on an opposite cabin wall. A particularly advantageous arrangement of the further aircraft seat regions on an opposite cabin wall can hence be achieved.

Furthermore, it is proposed that the aircraft seat system has at least two further first and second aircraft seat regions, which are arranged in a middle region of the aircraft cabin and are displaced in the flight direction relative to the aircraft seat regions. By a "middle region of an aircraft cabin" should here be understood, in particular, a region in an aircraft cabin which, viewed transversely to a flight direction, is arranged in a middle of the aircraft cabin. The middle region is here preferably delimited by two aircraft aisles, through which persons can make their way to the individual aircraft seats arranged in the middle region and on the cabin walls. A particularly advantageous and compact interleaving of the aircraft seat regions in a middle region of the aircraft cabin can hence be achieved.

It is also proposed that, on a cabin length of 450 inches, at least 38 aircraft seat regions are provided. By a "cabin length" should here be understood, in particular, a length of an aircraft cabin, in which length the aircraft seats can be arranged. The 450 inches which are quoted here for the cabin length correspond to a typical length of a Business Class compartment in an aircraft cabin. The aircraft cabin here has a cabin width which, together with the cabin length, spans a cabin area on which the aircraft seat regions are placed. A particularly good space utilization in the aircraft cabin can hence be achieved.

In this context, the aircraft seat system according to the invention is not intended to be limited to the application and embodiment described above. In particular, in order to fulfill a working principle described herein, the aircraft seat system according to the invention can have a number of individual elements, components and units which differs from a number stated herein.

DRAWINGS

Further advantages emerge from the following description of the drawings. In the drawings, an illustrative embodiment of the invention is represented. The drawings, the description and the claims contain numerous features in combination. The person skilled in the art will expediently also view the features individually and combine them into sensible further combinations.

In the drawings.

DESCRIPTION OF THE ILLUSTRATIVE EMBODIMENT

Figure 2:
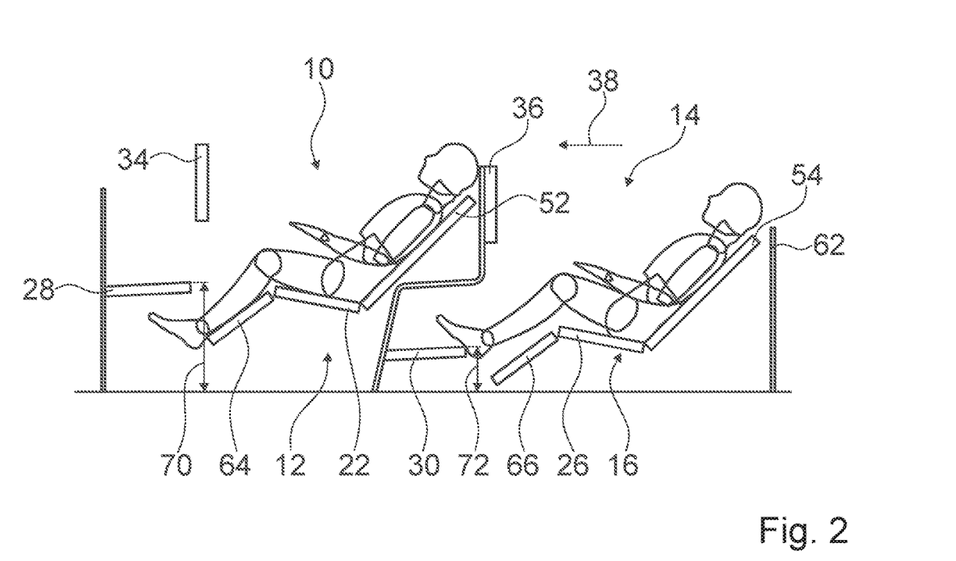
FIG. 2 shows a schematic representation of the two aircraft seats in a setting between the TTL position and a lying position.
Figure 3:
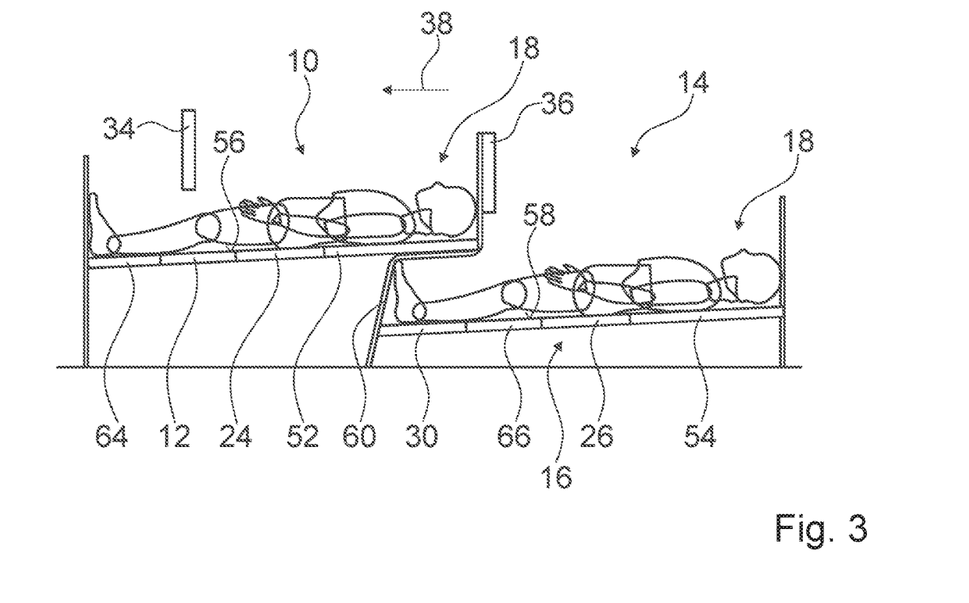
FIG. 3 shows a schematic representation of the two aircraft seats in the lying position.
Figure 4:
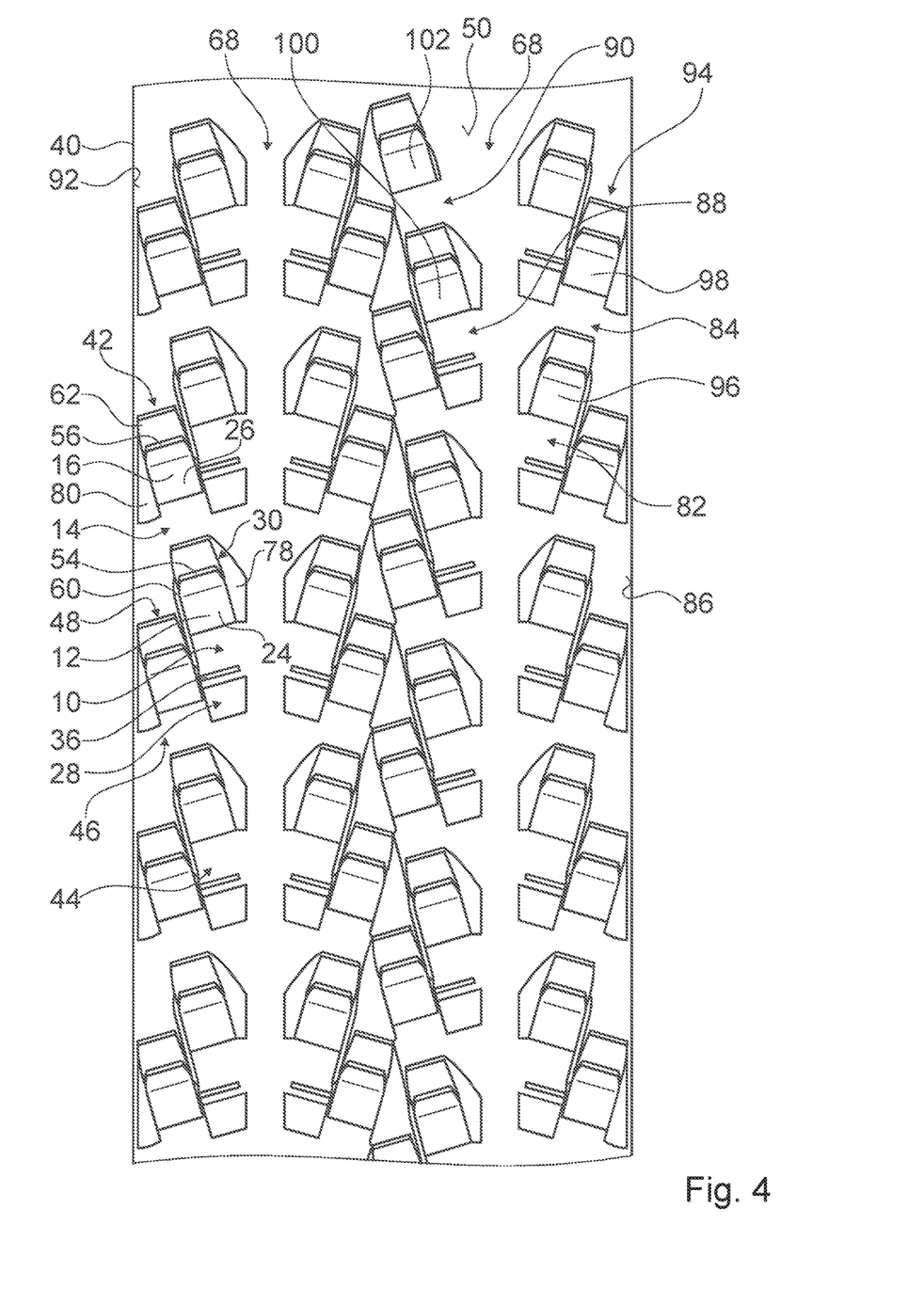
FIG. 4 shows a schematic representation of a plurality of first and second aircraft seat regions in an aircraft cabin.

FIGS. 1 to 4 show an aircraft seat system according to the invention. The aircraft seat system is part of an aircraft (not represented in detail). The aircraft comprises an aircraft cabin 40 (partially represented), in which the aircraft seat system is arranged. The aircraft cabin 40 forms a cabin floor 50. The cabin floor 50 forms a support plane of the aircraft cabin 40. The aircraft seat system comprises a first aircraft seat region 10. The first aircraft seat region 10 comprises a first aircraft seat 12. The aircraft seat system comprises a second aircraft seat region 14. The second aircraft seat region 14 comprises a second aircraft seat 16. The first aircraft seat region 10 and the second aircraft seat region 14 together form an aircraft seat unit 42. The aircraft seats 12, 16 are mounted on the support plane which is formed by the cabin floor 50 of the aircraft cabin 40. To this end, the aircraft seats 12, 16 respectively have a support unit (not represented in detail). The first aircraft seat region 10 comprises a shell element 60, which demarcates the first aircraft seat region 10 partially from a remainder of the aircraft cabin 40 and the second aircraft seat region 14. The second aircraft seat region 14 likewise comprises a shell element 62, which demarcates the second aircraft seat region 14 at least partially from a remainder of the aircraft cabin 40. The shell elements 60, 62 delimit the aircraft seat regions 10, 14 respectively in a side region and on a front side and a rear side, wherein the shell elements 60, 62 in a side region afford access to the respective aircraft seat region 10, 14. The shell elements 60, 62 shall not be hereinafter described here, since their design is sufficiently known from the prior art. The aircraft seat regions 10, 14 here respectively have a direct aisle access. A person can make his way from an aircraft aisle 68 of the aircraft cabin 40 directly into the appropriate aircraft seat region 10, 14. The aircraft seat system has further first aircraft seat regions 44 and second aircraft seat regions 46. The further first and second aircraft seat regions 44, 46 here respectively again form as a pair an aircraft seat unit 48 and respectively have an aircraft seat. In FIG. 4, the aircraft seat unit 48 and the aircraft seat unit 42 are here illustrated with their first aircraft seat regions 10, 44 and their second aircraft seat regions 14, 46. On a cabin length of 450 inches, the aircraft seat system has 38 aircraft seat regions 10, 14, 44, 46. The 38 aircraft seat regions 10, 14, 44, 46 are here respectively arranged in pairs in aircraft seat units 42, 48. The aircraft seat units 42, 48 with the aircraft seat regions 10, 14, 44, 46 are here arranged in the aircraft cabin 40 in a herringbone aircraft seat arrangement. The aircraft seats 12, 16 are here respectively oriented inclined with respect to a flight direction 38 of the aircraft. The aircraft seat unit 42, i.e. the aircraft seats 12, 16 of the aircraft seat regions 10, 14, are arranged on a cabin wall side. The aircraft seats 12, 16 here point with their rear side in the direction of a cabin wall 92. The aircraft seats 12, 16 here respectively have an angle of 10 degrees to the flight direction. A seat direction of the aircraft seats 12, 16 is oriented at the angle of 10 degrees to the flight direction 38. With a front end, the aircraft seats 12, 16 point respectively in the direction of a middle region of the aircraft cabin. The aircraft seat unit 48 is here arranged parallelly offset from the aircraft seat unit 42, wherein the rear sides of the corresponding aircraft seats are likewise oriented in the direction of the cabin wall 92. In principle, it is here also conceivable that the aircraft seats 12, 16 of the aircraft seat units 42, 48 are oriented in the direction of the cabin wall 92 and the rear sides of the aircraft seats 12, 16 are oriented respectively in the direction of the middle region of the aircraft cabin 40. The rear aircraft seat of the aircraft seat unit 48 is here oriented next to the first, front aircraft seat 12 of the first aircraft seat region 10. As can be seen in FIG. 4, the further aircraft seat units are arranged equivalently to the aircraft seat unit 42, 48 arranged respectively behind them. The aircraft seat system has further first aircraft seat regions 82 and second aircraft seat regions 84. The further aircraft seat regions 82, 84 are configured equivalently to the aircraft seat regions 10, 14, 44, 46. The further aircraft seat regions 82, 84 are here arranged in mirror image to the aircraft seat regions 10, 14 on an opposite cabin wall 86. The aircraft seat regions 82, 84 are arranged on the opposite cabin wall 86 likewise in aircraft seat units 94. An arrangement of the aircraft seat units 94 on the opposite cabin wall 92 is equivalent to the arrangement of the aircraft seat units 42, 48. The aircraft seat regions 82, 84 respectively have an aircraft seat 96, 98. As a result of the mirror-image arrangement of the aircraft seat regions 82, 84, the aircraft seats 96, 98 have with their seat direction likewise, an angle of 10 degrees to the flight direction 38.

The aircraft seat system has further first aircraft seat regions 88 and second aircraft seat regions 90. The aircraft seat regions 88, 90 are configured equivalently to the aircraft seat regions 10, 14, 44, 46. The aircraft seat regions 88, 90 are here arranged in the middle region of the aircraft cabin 40. In flight direction 38, the aircraft seat regions 88, 90 are here offset from the aircraft seat regions 10, 14. In the flight direction 38, the aircraft seat regions 88, 90 here point with their seat direction away from the middle region in the direction of the cabin wall 86. The aircraft seat regions 88, 90 comprise aircraft seats 100, 102, which are oriented at an angle of 10 degrees to the flight direction. Further aircraft seat regions (not indicated in detail), which are likewise arranged in the middle region, are configured in mirror image to the aircraft seat regions 88, 90 and their aircraft seats are oriented with their seat direction in the direction of the aircraft seat regions 10, 14 and the cabin wall 92. The further aircraft seat regions are here arranged, interleaved with the other aircraft seat regions 88, 90 which are facing toward one cabin wall 86, in the middle region of the aircraft cabin 40, and in this case facing toward the opposite cabin wall 92 (see FIG. 4). A particularly advantageous tight packing density of the aircraft seats 12, 16, 96, 98, 100, 102 and of the aircraft seat regions 10, 14, 44, 46, 82, 84, 88, 90 can hence be achieved.

Figure 1:
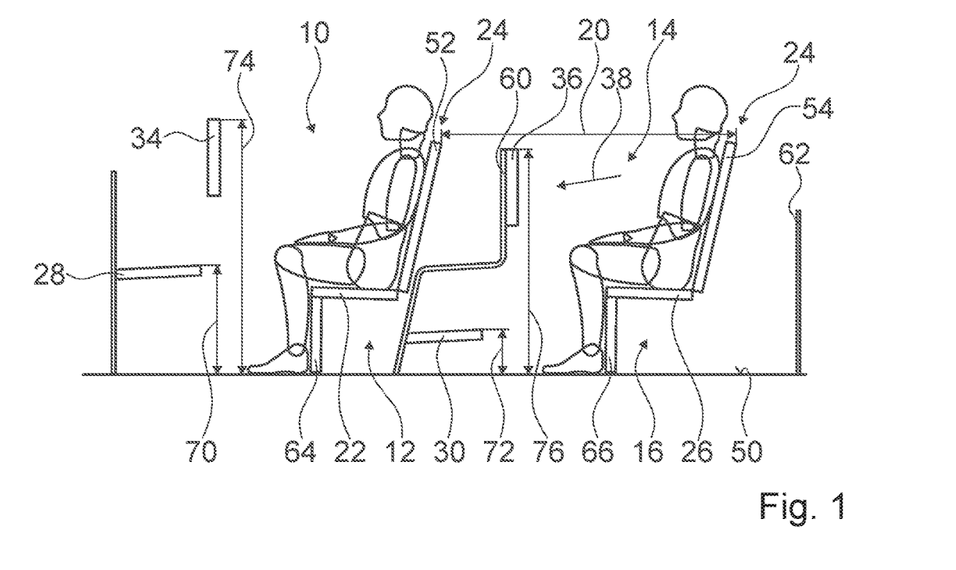
FIG. 1 shows a schematic representation of an aircraft seat system according to the invention, comprising two aircraft seat regions and their aircraft seats in a TTL position.

In the following, only the two aircraft seat regions 10, 14 of the aircraft seat unit 42 are described in detail. The following statements are here transferable to the other aircraft seat regions 44, 46, 82, 84, 88, 90 of the other aircraft seat units 48, 94. The other aircraft seat regions 44, 46, 82, 84, 88, 90 of the other aircraft seat units 48, 94 are configured substantially equivalently to the aircraft seat regions 10, 14 of the aircraft seat unit 42. The aircraft seats 12, 16 have a TTL position 24 and a lying position 18. In the TTL position 24, the aircraft seats 12, 16 are arranged in an upright setting, wherein a backrest 52, 54 of the respective aircraft seat 12, 16 is oriented substantially perpendicular to the support plane which is formed by the cabin floor 50. In the lying position 18, the two aircraft seats 12, 16 respectively form a planar lying surface 56, 58. The lying surfaces 56, 58 which are respectively formed by the aircraft seats 12, 16 in the lying position 18 have an angle of 3 degrees to the cabin floor 50. In principle, it is of course conceivable that the planar lying surfaces 56, 58 of the aircraft seats 12, 16 have a different angle to the cabin floor 50, which angle appears sensible to the person skilled in the art. The aircraft seats 12, 16 respectively comprise a kinematic system (not represented in detail), via which the aircraft seats 12, 16 can respectively be shifted between the TTL position 24 and the lying position 18. A kinematic system of the first aircraft seat 12 of the first aircraft seat region 10 is here configured differently than the kinematic system of the second aircraft seat 16 of the second aircraft seat region 14. As a result of the different kinematics, the two aircraft seats 12, 16 shift differently between the TTL position 24 and the respective lying position 18. The kinematic systems here respectively have actuators, via which the aircraft seats 12, 16 can respectively be adjusted between their various positions. In principle, it is of course also conceivable that, for the two aircraft seats 12, 16, a same kinematics system is used for the adjustment of the aircraft seats 12, 16, wherein the kinematic systems have, for instance, a doubly long travel path and are installed in both aircraft seats 12, 16 with a different orientation, so that the respective kinematic system has, according to orientation, a different travel path in an adjustment from the TTL position into the lying position. In principle, it is also conceivable that the same kinematics are integrated in both aircraft seats 12, 16 and the different travel paths are produced by a different actuation of the kinematics.

The aircraft seat 12 of the first aircraft seat region 10 and the aircraft seat 16 of the second aircraft seat region 14 are arranged in mutual alignment. The aircraft seat 12 of the first aircraft seat region 10 and the aircraft seat 16 of the second aircraft seat region 14 are arranged exactly one behind the other. Center axes of the two aircraft seats 12, 16, which respectively run parallel to a seat direction of the aircraft seats 12, 16, here lie coaxially to each other. The second aircraft seat 16 is here arranged behind the first aircraft seat 12. The second aircraft seat region 14 here lies behind the first aircraft seat region 10. Directional specifications, such as front and rear, here relate to a position in the aircraft, i.e. to a front end and a rear end of the aircraft. The two aircraft seats 12, 16 have an installation spacing 20 of 58 inches. The installation spacing 20 is here measured from two same points on the two aircraft seats 12, 16, the two aircraft seats 12, 16 being in a same position. By way of example, the installation spacing 20 is indicated in FIG. 1, the installation spacing 20 here being measured from a rearmost point on the aircraft seats 12, 16 in the TTL position 24.

In a mounted state, the second aircraft seat 16 of the second aircraft seat region 14 is arranged, in the lying position 18, overlapping beneath the first aircraft seat region 10. A region of the lying surface 58 which the second aircraft seat 16 forms in the lying position 18 is arranged, in relation to the cabin floor 50, beneath the first aircraft seat region 10. In the lying position 18, the lying surface 58 of the second aircraft seat 16 extends to under the first aircraft seat region 10 having the first aircraft seat 12. The aircraft seat 16 of the second aircraft seat region 14 overlaps by 18 inches with the first aircraft seat region 10. If both the first aircraft seat 12 and the second aircraft seat 16 are in the lying position 18, then a part of the planar lying surface 58 which the second aircraft seat 16 forms in the lying position 18 is arranged in relation to the cabin floor 50 beneath a region of the lying surface 56 which the first aircraft seat 12 forms in the lying position 18. In the lying positions 18, the two lying surfaces 56, 58 of the two aircraft seats 12, 16 overlap. Here, the lying surfaces 56, 58 of the two aircraft seats 12, 16 overlap in the lying position 18 by 15 inches. In principle, it is also conceivable that the lying surfaces 56, 58 of the two aircraft seats 12, 16 overlap in the lying position 18 by more than 15 inches, for instance by 18 inches or 20 inches. The first aircraft seat 12 and the second aircraft seat 16 here have in the respective lying position 18 different heights. The lying surface 56 of the first aircraft seat 12 is in the lying position 18 further distanced from the cabin floor 50 than the lying surface 58 of the second aircraft seat 16 in the lying position 18. An overlap of the two lying surfaces 56, 58 the lying positions 18 can hence be achieved. The lying surface 58 of the second aircraft seat 16 in the lying position 18, measured perpendicularly to the cabin floor 50, here has a distance of 12 inches to a boundary of the first aircraft seat region 10.

The aircraft seat 12 of the first aircraft seat region 10 has a seat bottom 22, which is pivotably coupled with the backrest 52 of the aircraft seat 12, and a leg rest 64, which pivotably coupled with the seat bottom 22. The seat bottom 22, the backrest 52 and the leg rest 64 of the aircraft seat 12 of the first aircraft seat region 10 are coupled with one another, and movable relative to one another, via the corresponding kinematics (not represented in detail) of the aircraft seat 12. In the lying position 18, the backrest 52, the seat bottom 22 and the leg rest 64 form a part of the lying surface 56 of the first aircraft seat 12. In an adjustment of the aircraft seat 12 of the first seat region 10 from the TTL position 24 into the lying position 18, the seat bottom 22 of the aircraft seat 12 is raised. In an adjustment of the aircraft seat 12 of the first seat region 10 from the lying position 18 into the TTL position 24, the seat bottom 22 of the aircraft seat 12 is lowered.

The aircraft seat 16 of the second aircraft seat region 14 has a seat bottom 26, which is pivotably coupled with the backrest 54 of the aircraft seat 16, and a leg rest 66, which is pivotably coupled with the seat bottom 26. The seat bottom 26, the backrest 54 and the leg rest 66 of the aircraft seat 16 of the second aircraft seat region 14 are coupled to one another, and movable relative to one another, via the corresponding kinematics (not represented in detail) of the aircraft seat 16. In the lying position 18, the backrest 54, the seat bottom 26 and the leg rest 66 form a part of the lying surface 56 of the second aircraft seat 16. In an adjustment of the aircraft seat 16 of the second seat region 14 from the TTL position 24 into the lying position 18, the seat bottom 22 of the aircraft seat 12 is lowered. In an adjustment of the aircraft seat 16 of the second seat region 14 from the lying position 18 into the TTL position. 24, the seat bottom 26 of the aircraft seat 12 is raised. In the TTL position 24, the seat bottom 22 of the aircraft seat 12 of the first seat region 10 has a same height as the seat bottom 26 of the aircraft seat 16 of the second aircraft seat region 14. As a result, in the TTL position 24, the two aircraft seats 12, 16 respectively have a same seat height. A constant seat height can hence advantageously be achieved for all aircraft seats 12, 16 of the aircraft seat system.

The first aircraft seat region 10 comprises a rigid leg rest 28. The rigid leg rest 28 is fixedly connected to the shell element 60 of the first aircraft seat region 10. The rigid leg rest 28 has an angle of 3 degrees to the cabin floor 50. The rigid leg rest 28 is here arranged at a front end of the first aircraft seat region 10. The leg rest 28 is provided to enlarge the lying surface 56 which the first aircraft seat 12 forms in the lying position 18. In the lying position 18 of the first aircraft seat 12, the rigid leg rest 28, together with the leg rest 64, the seat bottom 22 and the backrest 52 of the first aircraft seat 12, forms the planar lying surface 56 of the first aircraft seat 12. The second aircraft seat region 14 comprises a rigid leg rest 30. The rigid leg rest 30 is fixedly connected to the shell element 60 of the first aircraft seat region 10. The rigid leg rest 30 is here arranged on a side of the shell element 60 which is facing away from the first aircraft seat region 10. The rigid leg rest 30 juts into the second aircraft seat region 14. The rigid leg rest 30 has an angle of 3 degrees to the cabin floor 50. The rigid leg rest 30 is here arranged at a front end of the second aircraft seat region 14. The leg rest 30 is provided to enlarge the lying surface 58 which the second aircraft seat 16 forms in the lying position 18. In the lying position 18 of the second aircraft seat 16, the rigid leg rest 30, together with the leg rest 66, the seat bottom 26 and the backrest 54 of the second aircraft seat 16, forms the planar lying surface 58 of the first aircraft seat 12. A height 70 of the rigid leg rest 28 of the first aircraft seat region 10 is here greater than a height 72 of the rigid leg rest 30 of the second aircraft seat region 14. The height 70 of the first rigid leg rest 28 of the first aircraft seat region 10 is here measured perpendicularly to the cabin floor 50 up to a farthest point on the rigid leg rest 28. The height 70 of the rigid leg rest 28 of the first aircraft seat region 10 is here 21 inches. The height 72 of the rigid leg rest 30 of the second aircraft seat region 14 is here measured perpendicularly to the cabin floor 50 up to a farthest point on the rigid leg rest 30. The height 72 of the rigid leg rest 30 of the second aircraft seat region 14 is here 9 inches.

The first aircraft seat region 10 has a monitor 34. The monitor 34 of the first aircraft seat region 10 is here fastened to the shell element 60 of the first aircraft seat region 10. The first aircraft seat region 10 here has a mounting (not represented in detail), via which the monitor 34 is pivotably coupled with the shell element 60. The second aircraft seat region 14 has a monitor 36. The monitor 36 of the second aircraft seat region 14 is here fastened to the shell element 60 of the first aircraft seat region 10. The first aircraft seat region 10 here likewise has a mounting (not represented in detail), via which the monitor 34 is pivotably coupled with the shell element 60. The monitor 34 of the first aircraft seat region 10 here has a height 74 which is greater than a height 76 of the monitor 36 of the second aircraft seat region 14. The heights 74, 76 of the monitors 34, 36 of the aircraft seat regions 10, 14 are here measured perpendicularly to the cabin floor 50 up to a farthest point, i.e. an upper end of the respective monitor 34, 36. The height 74 of the monitor 34 of the first aircraft seat region 10 is here 50 inches. The height 76 of the monitor 36 of the second aircraft seat region 14 is here 44 inches. In principle, other heights 74, 76 for the monitors 34, 36 are also, of course, conceivable. In principle, it is likewise conceivable that the two monitors 34, 36, at least in an operating state, have a same height. It is here further conceivable that the at least one of the monitors 34, 36 is adjustable in its height, and thus, for instance for the positioning for the lying position 18 or for the TTL position 24, can be manually or automatically adjusted in its height. It is here conceivable that the corresponding monitor 34, 36 is coupled with a kinematic system of the corresponding aircraft seat 12, 16 and, upon adjustment of the corresponding aircraft seat 12, 16, is automatically adapted in its height to the corresponding position of the aircraft seat 12, 16.

The aircraft seat regions 10, 14 respectively have a storage shelf 78, 80. The storage shelves 78, 80 are here arranged alongside the corresponding aircraft seat 12, 16 of the corresponding aircraft seat region 10, 14, as can be seen in FIG. 4. The storage shelves 78, 80 are provided to serve as a table element or storage space. The storage shelves 78, 80 here extend next to the corresponding aircraft seat 12, 16 to behind the corresponding backrest 52, 54 in the TTL position 24 of the aircraft seat 12, 16. The storage shelf 78 of the first aircraft seat region 10 is here facing toward an aircraft aisle 68. The storage shelf 80 of the second aircraft seat region 14 is facing away from the aircraft aisle 68. The storage shelf 78 of the first aircraft seat region 10 here extends up to a front edge of the seat bottom. 22 of the first aircraft seat 12 in the TTL position 24. The storage shelf 80 of the second aircraft seat region 14 extends beyond a front edge of the seat bottom 26 of the second aircraft seat 16 in the TTL position 24. As a result of the interleaved arrangement of the aircraft seat units 42, 48 one to another, the storage shelves 78, 80 can here be configured advantageously large.

REFERENCE SYMBOLS 10 aircraft seat region
12 first aircraft seat
14 aircraft seat region
16 second aircraft seat
18 lying position
20 installation spacing
22 seat bottom
24 TTL position
26 seat bottom
28 leg rest
30 leg rest
34 monitor
36 monitor
38 flight direction
40 aircraft cabin
42 aircraft seat unit
44 aircraft seat region
46 aircraft seat region
48 aircraft seat unit
50 cabin floor
52 backrest
54 backrest
56 lying surface
58 lying surface
60 shell element
62 shell element
64 leg rest
66 leg rest
68 aircraft aisle
70 height
72 height
74 height
76 height
78 storage shelf
80 storage shelf
82 aircraft seat region
84 aircraft seat region
86 cabin wall
88 aircraft seat region
90 aircraft seat region
92 cabin wall
94 aircraft seat unit
96 aircraft seat
98 aircraft seat
100 aircraft seat
102 aircraft seat

The invention claimed is:

1. An aircraft seat system for an aircraft cabin, wherein the aircraft seat system comprises:
   at least one first aircraft seat region, which comprises a first aircraft seat, and the first aircraft seat has a seat bottom, which is pivotably coupled with a backrest of the first aircraft seat, and a leg rest, which is pivotably coupled with the seat bottom; and
   at least one second aircraft seat region, which is adapted to be arranged behind the first aircraft seat region and comprises a second aircraft seat, and the second aircraft seat has a seat bottom, which is pivotably coupled with a backrest of the second seat, and a leg rest, which is pivotably coupled with the seat bottom, wherein,
   in a mounted state, the aircraft seat of the second aircraft seat region is adapted to be arranged, at least in a lying position, at least partially overlapping beneath the first aircraft seat region,
   the seat bottom of the first aircraft seat is adapted to have, in a TTL position, a same height relative to a floor of the cabin as the seat bottom of the second aircraft seat in the TTL position,
   the aircraft seats, in a lying position, form planar lying surfaces,
   in the lying positions, the two lying surfaces of the two aircraft seats are adapted to overlap,
   the aircraft seats are adapted to be oriented inclined with respect to a flight direction,
   center axes of the two aircraft seats, which respectively run parallel to a seat direction of the aircraft seats, lie coaxially to each other,
   the aircraft seat regions are adapted to be arranged adjacent to a wall of the cabin and between the wall of the cabin and an aisle, and
   the aircraft seat regions are adapted to provide path of direct access to the aisle, and the path of direct access does not extend through another, adjacent aircraft seat region.

2. The aircraft seat system as claimed in claim 1, wherein the aircraft seats of the two aircraft seat regions are oriented in mutual alignment.

3. The aircraft seat system as claimed in claim 1, wherein in the lying position, the aircraft seat of the second aircraft seat region is adapted to overlap by at least 10 inches with the aircraft seat of the first aircraft seat region.

4. The aircraft seat system as claimed in claim 1, wherein the seat bottom of the aircraft seat of the first aircraft seat region, in an adjustment from the TTL position into the lying position, is provided to be raised.

5. The aircraft seat system as claimed in claim 1, wherein the seat bottom of the aircraft seat of the second aircraft seat region, in an adjustment from a TTL position into a lying position, is provided to be lowered.

6. The aircraft seat system as claimed in claim 1, wherein the first aircraft seat region has a rigid leg rest, the height of which is greater than a height of a rigid leg rest of the second aircraft seat region.

7. The aircraft seat system as claimed in claim 1, wherein the first aircraft seat region has a monitor, the height of which is greater than a height of a monitor of the second aircraft seat region.

8. The aircraft seat system as claimed in claim 1 comprising at least two further first and second aircraft seat regions.

9. The aircraft seat system as claimed in claim 1 comprising at least two further first and second aircraft seat regions, which are adapted to be arranged in mirror image to the aircraft seat regions adjacent to an opposite wall of the cabin.

10. The aircraft seat system as claimed in claim 1 comprising at least two further first and second aircraft seat regions, which are adapted to be arranged in a middle region of the aircraft cabin and displaced in a flight direction relative to the aircraft seat regions.

11. The aircraft seat system as claimed in claim 1, wherein on a cabin length of 450 inches, at least 38 aircraft seat regions are provided.

12. The aircraft seat as claimed in claim 1.

13. An aircraft seat system for an aircraft cabin, wherein the aircraft seat system comprises:
   at least one first aircraft seat region, wherein the first aircraft seat region comprises a first aircraft seat, and the first aircraft seat has a seat bottom, which is pivotably coupled with a backrest of the first aircraft seat, and a leg rest, which is pivotably coupled with the seat bottom; and
   at least one second aircraft seat region, which is arranged behind the first aircraft seat region and comprises a second aircraft seat, and the second aircraft seat has a seat bottom, which is pivotably coupled with a backrest of the second seat, and a leg rest, which is pivotably coupled with the seat bottom, wherein
   in a mounted state, the aircraft seat of the second aircraft seat region is adapted to be arranged, at least in a lying position, at least partially overlapping beneath the first aircraft seat region,
   the seat bottom of the first aircraft seat is adapted to have, in a TTL position, a same height relative to a cabin floor as the seat bottom of the second aircraft seat in the TTL position,
   the aircraft seats, in a lying position, form planar lying surfaces, wherein in the lying positions, the two lying surfaces of the two aircraft seats are adapted to overlap,
   the aircraft seat of the first aircraft seat region and the aircraft seat of the second aircraft seat region are adapted to be arranged exactly one behind the other,
   with a front end, the aircraft seats are adapted to point respectively in a direction of a middle region of the aircraft cabin if the aircraft seats are arranged along a first wall cabin of the cabin,
   the aircraft seats are adapted to be oriented inclined with respect to a flight direction,
   center axes of the two aircraft seats, which respectively run parallel to a seat direction of the aircraft seats, lie coaxially to each other,
   the aircraft seat regions are adapted to be arranged adjacent to a first wall of the cabin and between the first wall of the cabin and a first aisle;
   the first and second aircraft seat regions are adapted to provide a path of direct access to the first aisle, and
   the first aircraft seat region and the second aircraft seat region form a first set of seat regions, and a second set of seat regions, which is configured equivalently to the first set of seat regions, is adapted to be arranged adjacent to a second wall of the cabin and between the second wall of the cabin and a second aisle, wherein the second wall of the cabin is opposite to the first wall of the cabin.

14. An aircraft seat system for an aircraft cabin, wherein the aircraft seat system comprises:
   at least one first aircraft seat region, wherein the first aircraft seat region comprises a first aircraft seat, and the first aircraft seat has a seat bottom, which is pivotably coupled with a backrest of the first aircraft seat, and a leg rest, which is pivotably coupled with the seat bottom, and at least one second aircraft seat region, which is adapted to be arranged behind the first aircraft seat region, wherein the second aircraft seat region comprises a second aircraft seat, and the second aircraft seat has a seat bottom, which is pivotably coupled with a backrest of the second seat, and a leg rest, which is pivotably coupled with the seat bottom, wherein in a mounted state, the aircraft seat of the second aircraft seat region is adapted to be arranged, at least in a lying position, at least partially overlapping beneath the first aircraft seat region, the seat bottom of the first aircraft seat is adapted to have in a TTL position a same height relative to a floor of the cabin as the seat bottom of the second aircraft seat in the TTL position, the aircraft seats, in a lying position, form planar lying surfaces, in the lying positions, the two lying surfaces of the two aircraft seats are adapted to overlap, the aircraft seat of the first aircraft seat region and the aircraft seat of the second aircraft seat region are adapted to be arranged exactly one behind the other, center axes of the two aircraft seats, which respectively run parallel to a seat direction of the aircraft seats, lie coaxially to each other, the aircraft seats are adapted to be oriented inclined with respect to a flight direction, in the flight direction, the aircraft seat regions are adapted to point with their seat direction away from a middle region in a direction of a wall of the cabin in case the aircraft seat regions are arranged in the middle region of the aircraft cabin, the at least one first aircraft seat region is one of a plurality of first aircraft seat regions, and the at least one second aircraft seat region is one of a plurality of second aircraft seat regions, seat units are defined by one of the first aircraft seat regions and one of the second aircraft seat regions, and a first one of the seat units is adapted to be parallelly offset from a second one of the seat units.

15. The aircraft seat system as claimed in claim 14, wherein the at least one first aircraft seat region and the at least one second aircraft seat region are adapted to be arranged adjacent to a wall of the cabin such that the at least one first aircraft seat region and the at least one second aircraft seat region provide path of direct access to the aisle.

16. The aircraft seat system as claimed in claim 14, wherein the first aircraft seat region and the second aircraft seat region form a first set of seat regions, which are adapted to be arranged adjacent to a first wall of the cabin, and a second set of seat regions, which is configured equivalently to the first set of seat regions, is adapted to be arranged adjacent to a second wall of the cabin, wherein the second wall of the cabin is opposite to the first wall of the cabin.

17. The aircraft seat system as claimed in claim 1, wherein the at least one first aircraft seat region is one of a plurality of first aircraft seat regions, and the at least one second aircraft seat region is one of a plurality of second aircraft seat regions, seat units are defined by one of the first aircraft seat regions and one of the second aircraft seat regions, and a first one of the seat units is adapted to be parallelly offset from a second one of the seat units.

18. The aircraft seat system as claimed in claim 17, wherein the seat units are adapted to be arranged in a herringbone pattern.

* * * * *